United States Patent
Wedeen et al.

[11] Patent Number: 5,554,915
[45] Date of Patent: Sep. 10, 1996

[54] HIGH IMPEDANCE AC COUPLING METHOD FOR QUICK COMMAND RESPONSE IN TORQUE COMPENSATION SYSTEMS

[75] Inventors: Robert S. Wedeen, Manhattan Beach; Gholam D. Goodarzi, Torrance, both of Calif.

[73] Assignee: Delco Electronics Corporation, Kokomo, Ind.

[21] Appl. No.: 574,093

[22] Filed: Dec. 14, 1995

Related U.S. Application Data

[63] Continuation of Ser. No. 61,795, May 13, 1991, abandoned.

[51] Int. Cl.$^6$ ........................................ G05B 5/00
[52] U.S. Cl. ........................ 318/632; 318/432; 318/629
[58] Field of Search ........................ 318/632, 611, 318/629, 623, 650, 432, 482, 798–815; 382/812, 809, 820, 815, 930, 819; 307/562, 565; 364/152, 176, 178, 184

[56] References Cited

U.S. PATENT DOCUMENTS

| | | | |
|---|---|---|---|
| 2,451,710 | 10/1948 | Bechberger | 318/623 |
| 2,621,225 | 12/1952 | Hargreaves et al. | 318/623 X |
| 2,888,623 | 5/1959 | Atwood | 318/623 |
| 3,919,609 | 11/1975 | Klautschek et al. | 318/632 |
| 4,037,143 | 7/1977 | Soderberg | 318/52 |
| 4,527,107 | 7/1985 | van der Pol et al. | 318/482 X |
| 4,544,872 | 10/1985 | Hirano et al. | 318/632 |
| 4,595,867 | 6/1986 | Cognevich et al. | 318/632 X |
| 4,636,700 | 1/1987 | Moore et al. | 318/611 |
| 4,746,821 | 5/1988 | Norton | 307/565 |
| 4,839,573 | 6/1989 | Wise | 318/611 X |
| 4,991,429 | 2/1991 | Stacey et al. | 318/490 X |
| 5,196,775 | 3/1993 | Harris et al. | 318/638 |
| 5,282,129 | 1/1994 | Losic et al. | 318/632 X |
| 5,313,151 | 5/1994 | Ogden et al. | 318/805 |
| 5,349,278 | 9/1994 | Wedeen | 318/632 |
| 5,350,989 | 9/1994 | Wedeen | 318/632 |
| 5,395,269 | 10/1994 | Wedeen et al. | 318/432 |

*Primary Examiner*—Jonathan Wysocki
*Attorney, Agent, or Firm*—Mark A. Navarre

[57] ABSTRACT

A high impedance AC coupling arrangement that processes a transducer feedback signal derived from an output shaft of an electric vehicle motor to compensate for electrical motor pulsations. The high impedance AC coupling arrangement is coupled between the transducer and a summing device and generates a feedback compensation signal that is combined with an input signal to compensate for output shaft oscillations. The high impedance AC coupling arrangement includes a loop amplifier having a predetermined transfer function that is coupled to the transducer, and AC coupling circuitry, typically including a plurality of coupling capacitors, that is coupled between the loop amplifier and the summing device. A limiter circuit having first and second oppositely coupled diodes is coupled between a voltage source and a point between the AC coupling capacitors. A cascode amplifier is coupled to the AC coupling circuitry. Compensation for the pulsations is provided by utilizing the AC component of the signal derived from the transducer as a feedback signal from which compensation commands are derived. This AC-coupled signal is fed back with proper amplitude and phase shift to modulate and compensate the motor current and/or slip and/or speed and/or commutating angle and/or field current to eliminate torque fluctuations of the drive train of the vehicle. The present invention eliminates these unwanted pulsations over all modes of propulsion operation.

10 Claims, 3 Drawing Sheets

5,554,915

HIGH IMPEDANCE AC COUPLING METHOD FOR QUICK COMMAND RESPONSE IN TORQUE COMPENSATION SYSTEMS

This is a continuation of application Ser. No. 08/061795 filed May 13, 1993 now abandoned.

BACKGROUND

The present invention relates generally to torque compensation systems, and more particularly, to a high impedance AC coupling arrangement that provides for quick command response in such torque compensation systems.

Electric drive train systems can exhibit torque pulsations. For example, in an electric vehicle torque pulsations contribute to motor bearing and tire wear. At some speeds, the torque pulsations can also cause a noticeable vibration of the vehicle. These torque pulsations can be reduced or eliminated by feeding back a signal from a shaft mounted torque transducer. In some cases, it is necessary to AC couple this feedback signal through a capacitor and sum it with a main control signal for compensation. However, capacitive coupling the feedback signal through a low impedance can cause rise time limitations on the main control signal, such as an accelerator pedal in an electric vehicle.

Prior art concepts using torque transducer feedback have not had the flexibility of using high impedance feedback injection. If speed feedback is used, there is typically a trade-off between the amount of torque pulsation suppression and the maximum achievable closed loop acceleration rate. Consequently, it would be an improvement to have a circuit that limits the amount of feedback, and simultaneously provides for fast ramping of speed to improve the acceleration performance in an electric vehicle in which it is employed.

Accordingly, it is an objective of the present invention to provide for a high impedance AC coupling system that provides for quick command response in torque compensation systems.

SUMMARY OF THE INVENTION

In order to provide for the above and other objectives, the present invention comprises a high impedance AC coupling arrangement that provides for quick command response in a torque compensation system. The key aspect of the present invention is that coupling is performed through a high impedance AC source.

The high impedance AC coupling arrangement is adapted for use with a power control system that drives an electric motor having an output shaft. The power control system comprises an input source for providing an input command signal, a summing device having an output that has one input coupled to the input source, a controller coupled to the output of the summing device, and power switching circuitry coupled between the controller and the electric motor. A transducer is coupled to the output shaft of the electric motor and is adapted to sense pulsations. An oscillation compensation circuit is coupled between the transducer and a second input of the summing device that generates a feedback compensation signal that is combined with the input command signal that compensates for oscillations present in the output shaft of the electric motor.

The present invention thus provides coupling of the feedback compensation signal by utilizing the AC component of a signal derived from the transducer. This AC-coupled signal is fed back with proper amplitude and phase shift to modulate and compensate the motor current and/or slip and/or speed and/or commutating angle and/or field current to eliminate torque fluctuations of the drive train of the vehicle.

The high impedance AC coupling arrangement comprises a loop amplifier having a predetermined transfer function that is coupled to the transducer, and AC coupling means coupled between the loop amplifier and the summing device. The AC coupling means typically comprises a plurality of coupling capacitors. In a specific reduced to practice embodiment of the present invention, a limiter circuit is coupled to a point between the AC coupling capacitors, which comprises first and second oppositely coupled dimes. The high impedance AC coupling arrangement may also comprise a switching circuit coupled to the AC coupling means.

The high impedance AC coupling arrangement is coupled between the transducer and a second input of the summing device and generates a feedback compensation signal that is combined with the input command signal that compensates for oscillations or pulsations sensed in the output shaft of the electric motor. The present high impedance AC coupling arrangement permits the input command signal, comprising an accelerator pedal signal, to be summed with the capacitively coupled feedback signal without affecting the accelerator pedal response time.

Conventional capacitive coupling from the low impedance output of an amplifier to a high impedance point in a controller can cause acceleration hesitations. However, and in accordance with the present invention, coupling through a high impedance AC source eliminates hesitation without the need to switch the feedback loop out of the circuit during quick acceleration demands. Also, a clipping diode circuit in the present invention prevents acceleration limiting during times of quasi-steady state peak acceleration.

Applications of the present invention include stabilizing drive trains that exhibit pulsations, at any speed, in motoring or regeneration and include power control systems, and the like. The present invention provides for relatively smooth vehicle handling over a broad range of speeds for every mode of propulsion operation while permitting quick acceleration response time without opening a feedback loop. The present invention may be used in many power control systems, especially those that require quick response to a command.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
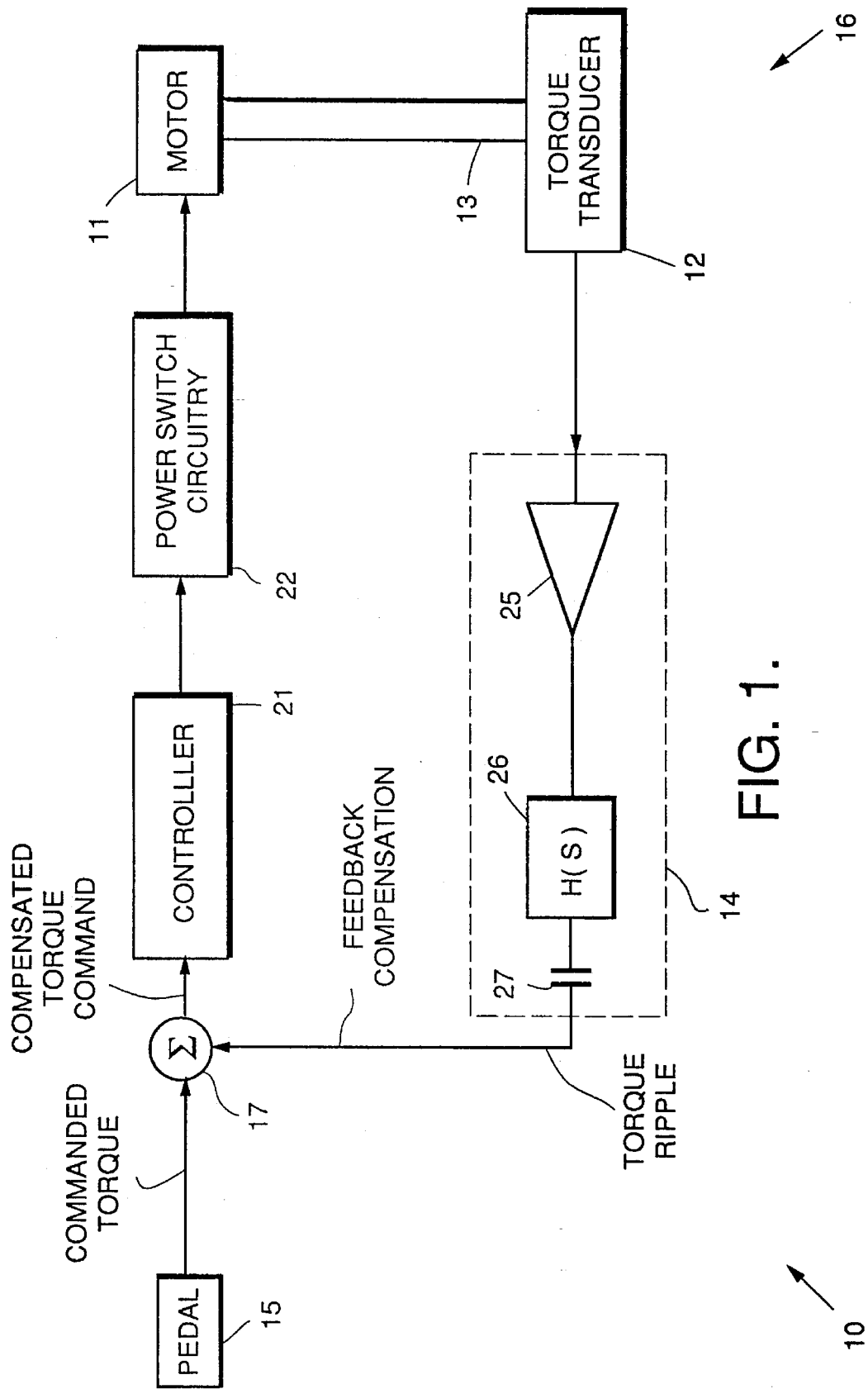
FIG. 1 illustrates a block diagram showing an exemplary torque oscillation compensation system using a high impedance AC coupling arrangement in accordance with the principles of the principles of the present invention.

Referring to the drawing figures, Referring to the drawing figures, FIG. 1 illustrates a block diagram showing a torque oscillation compensation system 10 using torque transducer feedback, and employing a high impedance AC coupling arrangement 14 in accordance with the principles of the present invention. The torque oscillation compensation system 10 is employed with an electric motor 11 of an electric vehicle 16 and is comprised of a torque transducer 12 that is coupled to a drive shaft 13 that is coupled to the motor 11. A torque signal derived from an accelerator pedal 15 of the vehicle 16 is coupled by way of one input of a summing circuit 17 to a controller 21. The controller 21 is coupled by way of power switching circuitry 22 to the motor 11 and applies appropriate signals thereto that cause the motor 11 to accelerate and decelerate and to run in forward and reverse directions.

The high impedance AC coupling arrangement 14 is comprised of an AC coupled loop amplifier circuit 14 that is coupled between the torque transducer 12 and a second input of the summing circuit 17. The AC coupled loop amplifier circuit 14 (AC coupling arrangement 14) is comprised of an amplifier 25, a transfer function device 26 and a capacitor 27 that implements the AC coupling of a feedback signal derived from the torque transducer 12. The torque transducer 12 samples the torque ripple experienced by the motor 11 and this torque ripple signal is amplified and phase shifted by the AC coupled loop amplifier circuit 14. The AC coupled amplifier 14 provides the desired torque ripple signal which, when combined with the torque signals derived from the accelerator pedal 15 in the summing circuit 17, substantially reduces or eliminates torque fluctuations experienced by the motor 11. The output of the summing circuit 17 comprises a compensated torque command the is applied to the motor 11 and which substantially reduces or eliminates torque fluctuations therein.

Torque at the drive shaft 13 of the motor 11 is converted to an electrical signal by use of the torque transducer 12. Undesirable torque ripple appears as an AC component of the output signal of the torque transducer 12 and is AC coupled to the loop amplifier circuit 14. The loop amplifier 14 is designed to have the appropriate gain and phase shift that provides sufficient negative feedback for elimination of the torque pulsations. The loop amplifier circuit 14 output is summed with the main torque command input derived from the accelerator pedal 15 so that it can modulate and compensate the motor commands to eliminate the torque pulsation.

Figure 2:
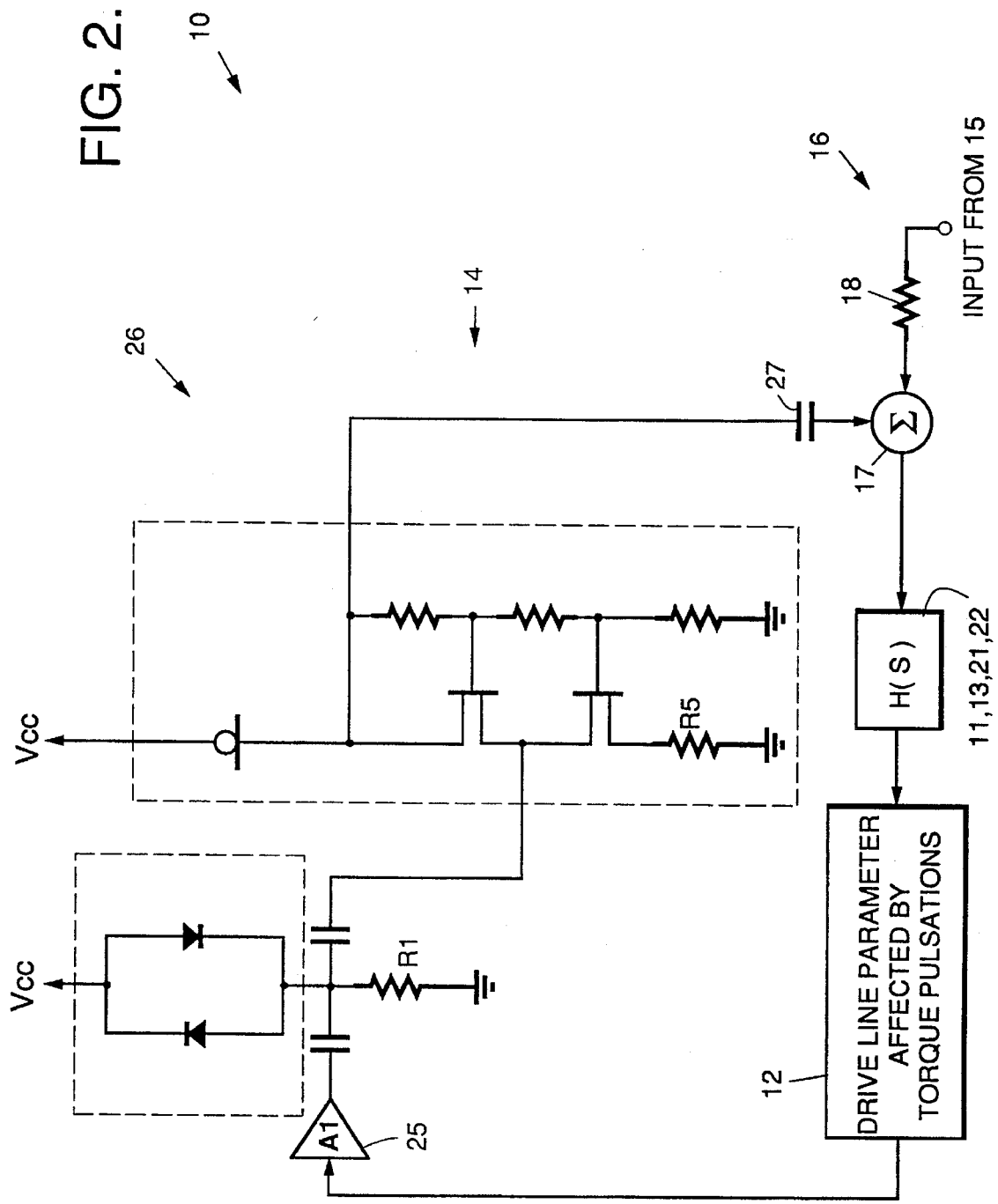
FIG. 2 illustrates a block diagram showing a genetic torque oscillation compensation system using the high impedance AC coupling arrangement of the present invention.

Referring to FIG. 2, it illustrates a block diagram showing a generic oscillation compensation system 10 using the high impedance AC coupling arrangement 14 in accordance with the principles of the present invention. The oscillation compensation system 10 may be employed with the electric motor 11 of the electric vehicle 16 and is comprised of the torque transducer 12, for example, and the drive shaft 13 that is coupled to the motor 11. A torque input signal derived from the accelerator pedal 15 of the vehicle 16 is coupled through an input resistor 18 to one input of the summing device 17 and thereafter to the controller 21. As is depicted in FIG. 1, for example, the controller 21 is coupled by way of the power switching circuitry 22 to the motor 11 and applies appropriate signals thereto that cause the motor 11 to accelerate and decelerate and to run in forward and reverse directions. However, for the purposes of the description of the genetic embodiment of the present invention, the motor 11, drive shaft 13, controller and power switching circuitry 22 shown in FIG. 2 are illustrated as comprising a generic transfer function H(s) that represents these components. The torque transducer 12 is represented by a generic box representative of a drive line parameter affected by torque pulsations.

The high impedance AC coupling arrangement 14 is coupled between the transducer 12 and a second input of the summing device 17. The high impedance AC coupling arrangement 14 is comprised of the amplifier 25, a transfer function device 26 and the capacitor 27 that implements the AC coupling of a feedback signal derived from the torque transducer 12. The torque transducer 12 samples the torque tipple experienced by the motor 11 and this torque ripple signal is amplified and phase shifted by the high impedance AC coupling arrangement 14. The high impedance AC coupling arrangement 14 provides the desired torque tipple signal which, when combined with the torque signals derived from the accelerator pedal 15 in the summing device 17, substantially reduces or eliminates torque fluctuations experienced by the motor 11. The output of the summing device 17 comprises a compensated torque command that is applied to the motor 11 and which substantially reduces or eliminates torque fluctuations therein. The details of the high impedance AC coupling arrangement 14 will be described below with respect to FIG. 3.

The high impedance AC coupling arrangement 14 is disclosed herein with respect to a system employing torque transducer feedback. It is to be understood that the present invention is not limited only to torque transducer feedback, but may be employed with any type of feedback arrangement, including torque or velocity feedback, for example. Therefore, the present invention should not be considered as limited to torque transducer feedback based systems.

Torque at the drive shaft 13 of the motor 11 is convened to an electrical signal by use of the torque transducer 12. Undesirable torque tipple appears as an AC component of the output signal of the torque transducer 12 and is AC coupled to the high impedance AC coupling arrangement 14. The high impedance AC coupling arrangement 14 is designed to have the appropriate gain and phase shift that provides sufficient negative feedback for elimination of the torque pulsations. The high impedance AC coupling arrangement 14 output is summed with the main torque command input derived from the accelerator pedal 15 so that it can modulate and compensate the motor commands to eliminate the torque pulsation.

Figure 3:
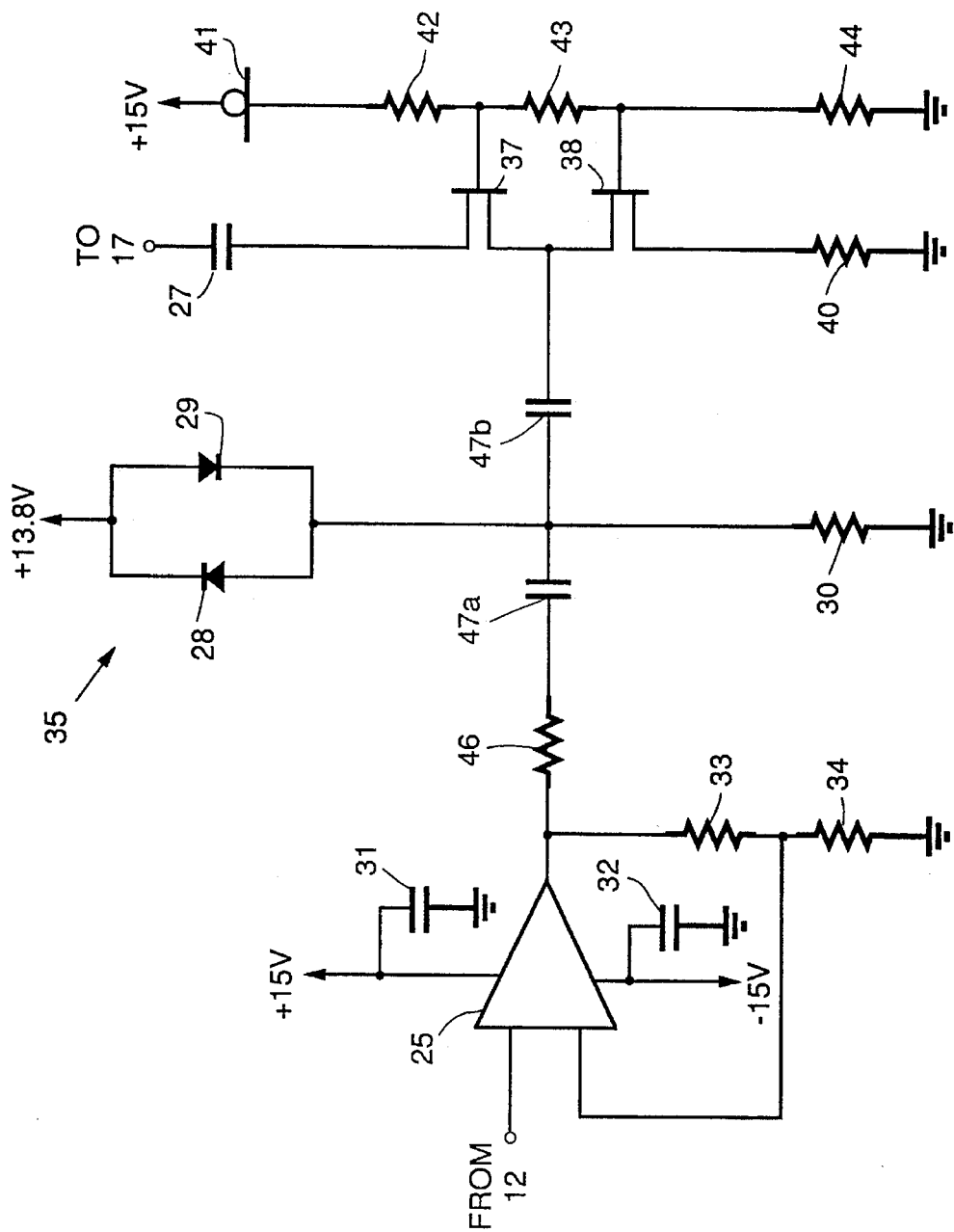
FIG. 3 is a detailed diagram illustrating an embodiment of the high impedance AC coupling arrangement of FIG. 2 that has been reduced to practice.

Referring to FIG. 3, it shows a detailed diagram illustrating an embodiment of the high impedance AC coupling arrangement 14 that has been reduced to practice, and that is employed in the system 10 of FIG. 2. The high impedance AC coupling arrangement 14 comprises the amplifier 25, such as a model 324 amplifier, manufactured by National Semiconductor, for example. Two filter capacitors 31, 32 are employed, and two resistors 33, 34 set the gain of the amplifier 25, taken from a point between the two resistors 33, 34 that are coupled between the output of the amplifier 25 and ground. The two filter capacitors 31, 32 are coupled between the amplifier 25 and +15 volt and −15 volt power supplies, respectively.

The output of the amplifier 25 is coupled by way of a third resistor 46 through two AC coupling capacitors 47a, 47b to a cascode amplifier 36 employing two FET transistors 37, 38. Two diodes 28, 29, such as model 1N4003 diodes are coupled between a +13.8 volt power source and a point between the two AC coupling capacitors 47a, 47b. The two diodes 28, 29 form an optional limiter circuit 35. A fourth resistor 30 is also coupled from a point between the two AC coupling capacitors 47a, 47b and ground. The cascode amplifier 36 is comprised of a constant current diode 41, such as a model 1N5305 diode, for example, which is coupled between a +15 volt power supply and ground by way of a voltage divider network 45 comprising three resistors 42, 43, 44.

The two FET transistors 37, 38 are coupled to the summing device 17 by way of the capacitor 27, and ground by way of a fifth resistor 40. The gates of the FET transistors 37, 38 are coupled to points taken between the respective first and second resistors 42, 43 and second and third resistors 43, 44 of the voltage divider network 45, respectively.

For the purpose of completeness, the following is a listing of the values for each of the resistors and capacitors shown in FIG. 3: resistor 4=100 ohms; resistor 30=200 Kohms; resistor 33=10 Kohms; resistor 34=5.1 Kohms; resistor 40=2.4 Kohms; resistor 42=1 Mohms; resistor 43=1 Mohms; resistor 44=1 Mohms; capacitor 47a=160 microfarads 50 volts; capacitor 47b=160 microfarads 50 volts; capacitor 31=0.1 microfarads; capacitor 32=0.1 microfarads; and capacitor 27=5 microfarads.

FIG. 3 depicts a form of the present invention which was utilized in practice. In operation, torque pulsations affect drive line parameters such as torque, speed or battery current. This parameter disturbance is amplified by the loop amplifier 25. The AC component is coupled to the high impedance coupling circuit through the coupling capacitors 47a, 47b. The limiter circuit 35, comprising the two diodes 28, 29, clips transients and prevents feedback from desirable, fast, high amplitude changes in the relevant drive line parameter. Feedback of this nature, could limit the maximum acceleration of the electric vehicle 16. The two FET transistors 37, 38, constant current diode 41, and the accompanying resistors comprise the high impedance coupling arrangement 14. This arrangement 14 permits the amplified AC component of the feedback signal to sum with the main control signal derived from the accelerator pedal 15 without applying a low impedance point to the capacitor 27. This would normally limit the response time of the main control signal through the input resistor 18 of the of the system 10 as it charges the capacitor 27 according to their RC time constant.

Instead, the AC feedback signal is superimposed on the main control signal, as desired, but through the high impedance coupling provided by the present coupling arrangement 14, so that the main control signal is not affected by the time constant of the input resistor 18 and capacitor 27. This prevents severe limitations on the rise time and fall time of the control signal, thereby improving the system response H(S).

Thus there has been described a new and improved high impedance AC coupling arrangement for use with feedback compensation systems such as for electric vehicle drive trains. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In an oscillation compensation system for use with an electric motor having an output shaft, a transducer coupled to the output shaft for sensing pulsations present therein, an input source for providing a command input signal, a summing device having an output and having one input coupled to the input source, a controller coupled to the output of the summing device, and power switching circuitry coupled between the controller and the electric motor, wherein the improvement comprises:

an AC coupling arrangement coupled between the transducer and a second input of the summing device that generates a feedback compensation signal that is combined with the commanded input signal that compensates for oscillations present in the output shaft of the electric motor, and wherein the AC coupling arrangement comprises:
a loop amplifier coupled to the transducer;
AC coupling means coupled between the loop amplifier and the summing device; and
a high impedance signal source having an impedance that is relatively high compared to the impedance of the loop amplifier coupled between the loop amplifier and the AC coupling means.

2. The system of claim 1 wherein the AC coupling means comprises a plurality of series coupled coupling capacitors.

3. The system of claim 2 wherein the AC coupling arrangement further comprises a limiter circuit coupled between a voltage source and a point between the coupling capacitors.

4. The system of claim 2 wherein the limiter circuit comprises first and second oppositely coupled diodes connected in parallel.

5. The system of claim 2 wherein the oscillation compensation circuit further comprises a cascode amplifier coupled in series with the AC coupling means.

6. An AC coupling arrangement for use with an electric motor having an output shaft, and wherein the electric motor is driven by power switching circuitry controlled by a controller said circuit comprising:

a transducer coupled to the output shaft of the electric motor for sensing pulsations present in output shaft of the electric motor;
a summing device having an output coupled to an input of the controller and having one input coupled to receive an input command signal; and
an AC coupling circuit coupled between the transducer and a second input of the summing device that generates a feedback compensation signal that is combined with the input command signal that compensates for oscillations present in the output shaft of the electric motor, and wherein the AC coupling circuit comprises:
a loop amplifier coupled to the transducer;
AC coupling means coupled between the loop amplifier and the summing device; and
a high impedance signal source having an impedance that is relatively high compared to the impedance of the loop amplifier coupled between the loop amplifier and the AC coupling means.

7. The system of claim 6 wherein the AC coupling means comprises a plurality of series coupled coupling capacitors.

8. The system of claim 7 wherein the AC coupling circuit further comprises a limiter circuit coupled between a voltage source and a point between the coupling capacitors.

9. The system of claim 7 wherein the limiter circuit comprises first and second oppositely coupled diodes connected in parallel.

10. The system of claim 7 wherein the AC coupling circuit further comprises a cascode amplifier coupled in series with the AC coupling means.

* * * * *